L. W. CHUBB.
SPLICE FOR CONDUCTORS.
APPLICATION FILED JAN. 5, 1915.
1,281,517.
Patented Oct. 15, 1918.
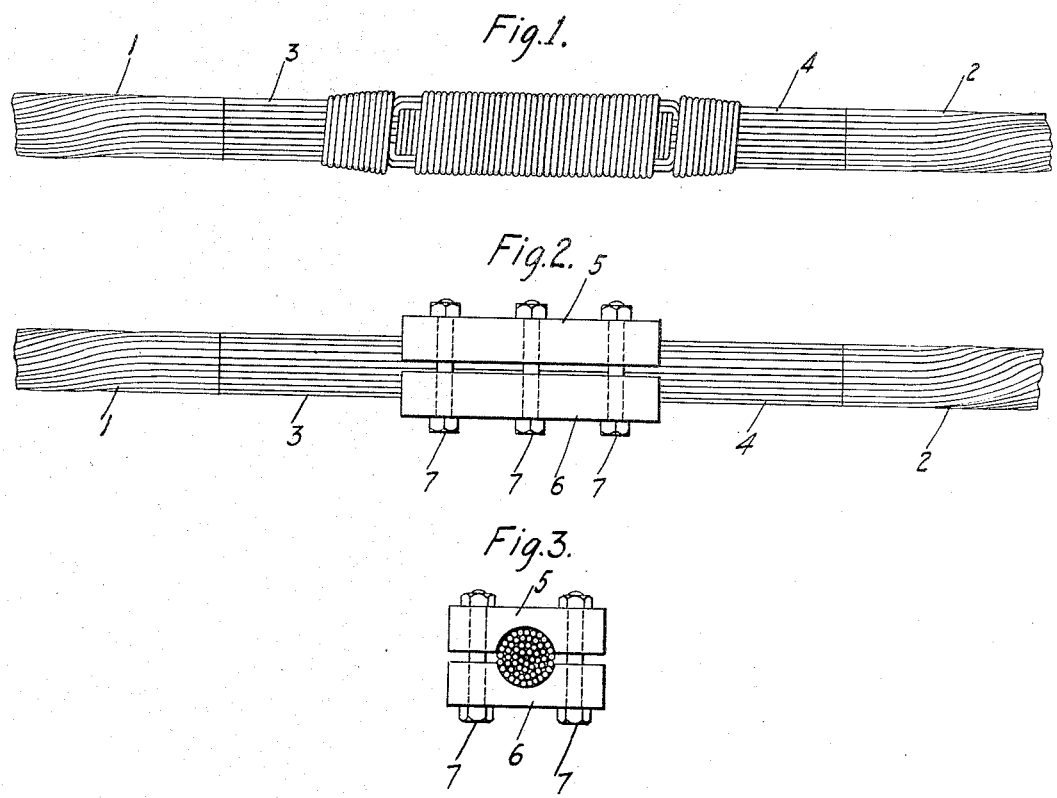
WITNESSES:
INVENTOR
Lewis W. Chubb.
BY
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

SPLICE FOR CONDUCTORS.

1,281,517. Specification of Letters Patent. Patented Oct. 15, 1918.

Application filed January 5, 1915. Serial No. 617.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Splices for Conductors, of which the following is a specification.

My invention relates to splices for conductors, and has for its object to provide means for making a spliced or a clamped connection between two conductors, that, heretofore, could not be effectively and economically clamped or soldered for electrical use.

There are many metals that are not easily soldered, others that are not clampable for electrical use and still others that are neither solderable nor clampable for electrical use. Aluminum is neither solderable nor clampable for electrical use, hence it has heretofore been extremely difficult to produce a satisfactory splice between two aluminum conductors. However, a satisfactory welded joint between two aluminum conductors or between an aluminum conductor and a copper conductor may be obtained by the process set forth in my U. S. Patent #1,066,468, granted July 8, 1913.

In order to provide an effective junction between conductors that are not easily soldered and between conductors that cannot be clamped to provide such junction, such as stranded aluminum cables, I electropercussively weld a copper conductor on the end of each strand of the cable. I then splice the copper conductors together and solder or clamp them in the usual way to obtain a dependable connection not heretofore obtainable.

Figure 1 of the accompanying drawing is a detailed side view of a soldered splice that is made according to my invention, and Figs. 2 and 3 are detailed side and end views, respectively, of a clamped splice that is made according to my invention.

Two aluminum stranded cables 1 and 2, that are to be spliced, are provided with a plurality of sets of copper conductors 3 and 4, respectively. Each conductor of each set is welded to a corresponding conductor of its cable. This may be done by discharging a condenser or a circuit of relatively high capacitance through the junction effected when the copper and aluminum are brought into engagement, thus causing the two metals to be welded together before the aluminum is permitted to oxidize. This method of electro-percussively welding is substantially as set forth in U. S. Patent #1,066,468, issued July 8, 1913. However, I do not limit my invention to this particular method of welding, provided any other suitable method may be found.

After each conductor is provided with a copper or other solderable or clampable metal tip, the sets of tips 3 and 4 may be spliced together, as shown in Fig. 1, by any of the well known methods and then soldered to constitute an effective splice. However, if desired, the sets of tips 3 and 4 may be clamped together by clamping members 5 and 6 that are held together by a plurality of bolts 7, substantially as shown in Figs. 2 and 3 of the drawings.

I do not limit my invention to any particular type of splice or to any kind of conductors except as set forth in the appended claims.

I claim as my invention:

1. A connecting means for non-solderable conductors comprising a splice between solderable conductors that are welded end-to-end with respect to the non-solderable conductors.

2. A connecting means for conductors comprising a splice between easily soldered conductors that are welded end-to-end with respect to the other conductors.

3. A connecting means for aluminum conductors comprising a splice between easily soldered conductors that are welded end-to-end with respect to the aluminum conductors.

4. A connecting means for aluminum conductors comprising a splice between copper conductors that are welded end-to-end with respect to the aluminum conductors.

5. A means for joining aluminum conductors comprising a splice between easily spliced conductors that are welded end-to-end with respect to the aluminum conductors.

6. A means for joining non-solderable and non-clampable conductors comprising a splice between solderable and clampable conductors that are welded end-to-end with respect to the non-solderable and non-clampable conductors.

7. A means for joining non-clampable conductors comprising a splice between clampable conductors that are secured end-to-end with respect to the non-clampable conductors.

8. A means for joining non-spliceable conductors comprising a splice between spliceable conductors that are welded end-to-end with respect to the non-spliceable conductors.

In testimony whereof I have hereunto subscribed my name this 24th day of Dec., 1914.

LEWIS W. CHUBB.

Witnesses:
B. B. HINES,
M. C. MERZ.